US009633576B2

(12) United States Patent
Reed (10) Patent No.: US 9,633,576 B2
(45) Date of Patent: Apr. 25, 2017

(54) VEHICLE ACTIVITY INFORMATION SYSTEM

(71) Applicant: Alliance Wireless Technologies, Inc., Houston, TX (US)

(72) Inventor: James Darrick Reed, Richmond, TX (US)

(73) Assignee: Alliance Wireless Technologies, Inc., Katy, TX (US)

( * ) Notice: Subject to any disclaimer, the term of this patent is extended or adjusted under 35 U.S.C. 154(b) by 469 days.

(21) Appl. No.: 14/105,564

(22) Filed: Dec. 13, 2013

(65) Prior Publication Data

US 2014/0170602 A1    Jun. 19, 2014

Related U.S. Application Data

(60) Provisional application No. 61/736,999, filed on Dec. 13, 2012.

(51) Int. Cl.
G09B 9/04         (2006.01)
G09B 19/16        (2006.01)

(52) U.S. Cl.
CPC .................................. G09B 19/167 (2013.01)

(58) Field of Classification Search
CPC ....................................................... G09B 9/04
USPC ......................................................... 434/62
See application file for complete search history.

(56) References Cited

U.S. PATENT DOCUMENTS

| 8,485,301 | B2 | 7/2013 | Grubaugh et al. |
| 2008/0262670 | A1 | 10/2008 | McClellan et al. |
| 2009/0210257 | A1* | 8/2009 | Chalfant ................ G06Q 40/08 705/4 |
| 2010/0049395 | A1 | 2/2010 | Duddle et al. |
| 2011/0035139 | A1 | 2/2011 | Konlditslotis et al. |
| 2011/0125663 | A1* | 5/2011 | Kraft .................. G06K 17/0022 705/333 |
| 2012/0072244 | A1 | 3/2012 | Collins et al. |
| 2012/0135382 | A1* | 5/2012 | Winston ............... G09B 19/167 434/65 |
| 2012/0253888 | A1* | 10/2012 | Davidson ............... G06Q 10/08 705/7.38 |
| 2013/0013348 | A1* | 1/2013 | Ling ...................... G06Q 40/08 705/4 |

(Continued)

*Primary Examiner* — Xuan Thai
*Assistant Examiner* — Robert P Bullington
(74) *Attorney, Agent, or Firm* — Kevin Soules; Kermit D. Lopez; Luis M. Ortiz (57) ABSTRACT

The disclosed apparatus, system, and method serve to modify a driver's behavior, reduce accident costs, and generate more revenue from a company vehicle. Risky behavior that often leads to accidents, personal injury, property damage, and loss of a driver's livelihood is highlighted in the disclosed system. By focusing on a driver's unsafe actions, the disclosed system teaches a driver to correct unsafe driving behaviors. An employer or insurance company, for example, can access all data captured before, during, and after the accident or event to assist with finding fault. The disclosed vehicle activity information system is fully configurable at all times during installation of the system and during use thereof. A plurality of integrated cameras provides constant video surveillance of the interior and exterior of a vehicle, thus working simultaneously to capture a driver's actions in the vehicle information activity system.

14 Claims, 9 Drawing Sheets

(56) References Cited

U.S. PATENT DOCUMENTS

2013/0286204 A1  10/2013  Cheng

* cited by examiner

VEHICLE ACTIVITY INFORMATION SYSTEM

CROSS-REFERENCE TO PROVISIONAL APPLICATION

This application claims priority under 35 U.S.C. 119(e) to U.S. Provisional Patent Application Ser. No. 61/736,999, entitled "Vehicle Activity Information System," which was filed on Dec. 13, 2012, the disclosure of which is incorporated herein by reference in its entirety.

FIELD OF THE INVENTION

The disclosed embodiments relate to vehicular data acquisition. The disclosed embodiments further relate to monitoring driver behavior. The disclosed embodiments also relate to real-time management of fleet vehicles.

BACKGROUND

Certain driver factors such as speeding, inattention, fatigue, and unfamiliarity with roads accounts for majority of all vehicular crashes. Driver error is ten times more likely to be the cause of truck-related accidents as compared to other factors such as poor road conditions, weather, and mechanical malfunctions. As a means to reduce truck-related accidents, greater attention needs to be focused on developing systems for monitoring at-risk driver behavior in motor vehicle fleets to improve driver safety. Fleet operators incur losses as a result of excess fuel and maintenance costs, as well as losses due to inefficient management of individual vehicles in the fleet as well as groups of fleet vehicles such as those located in a specific geographic area.

Modern vehicles use a number of communication systems and/or networks, which could be utilized to collect driver and vehicular data. Each of these communication systems and/or networks may have a bus structure that is open or proprietary. Each of these buses may also be specifically designed to work in a vehicle or may be available as a general communication protocol. For example, the high-speed CAN bus carries information that is vital for vehicle operation or safety and is delivered to various parts of the vehicle or system in substantially real time.

Therefore, a need exists for an improved driver monitoring system that collects vehicular and driver data to improve driving behaviors.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide for improved vehicular data acquisition.

It is another aspect of the disclosed embodiments to provide for monitoring driver behavior.

It is a further aspect of the disclosed embodiments to provide for real-time management of fleet vehicles.

The above and other aspects can be achieved as is now described. The disclosed apparatus, system, and method serve to modify a driver's behavior, reduce accident costs, and generate more revenue from a company vehicle. Risky behavior that often leads to accidents, personal injury, property damage, and loss of a driver's livelihood is highlighted in the disclosed system. By focusing on a driver's unsafe actions, the disclosed system teaches a driver to correct unsafe driving behaviors. An employer or insurance company, for example, can access all data captured before, during, and after the accident or event to assist with finding fault. The disclosed vehicle activity information system is fully configurable at all times during installation of the system and during use thereof. A plurality of integrated cameras provides constant video surveillance of the interior and exterior of a vehicle, thus working simultaneously to capture a driver's actions in the vehicle information activity system.

A vehicle activity information system is disclosed. In an embodiment, the system includes a processor; a data bus coupled to the processor; and a non-transitory computer-usable tangible storage device storing computer program code, the compute program code comprising program instructions executable by the processor. The computer program instructions comprise of instructions to: collect driver and vehicular information; analyze the collected vehicular and driver information; and configure parameters for displaying the collected driver and vehicular parameters to improve driving behavior. In one embodiment, the vehicle and driver information and the parameters comprise at least one of: event details, observations, driver detail, sharing, download video, unsafe driving, stopping, speeding, driver behavior, collisions, equipment, scoring, map, location, coaching session, revise scoring, save coaching, no action, and fuel monitoring.

In another embodiment, the vehicle activity information system comprises program instructions to review and score the collected and analyzed vehicular and driver information, wherein the collected and analyzed vehicular and driver information is reviewed by a supervisor of a driver; and program instructions to educate a driver based on improved driving behavior based on the collected and analyzed vehicular and driver information. In yet another embodiment, the vehicle activity information system comprises program instructions to automatically trigger collection of the vehicular and driver information, wherein a trigger comprises at least one of the vehicle running a red light, tailgating another vehicle or being tailgated by another vehicle, speeding as determined by a current speed limit based on a certain location as gathered by the system, g-force, manual operation, and the vehicle speeding at a predetermined rate. In an embodiment, the vehicle activity information system comprises program instructions to collect vehicular and driver data from a smartphone, tablet, or a plurality of integrated cameras, wherein the plurality of integrated cameras provide continuous video surveillance of an interior and an exterior of a vehicle, wherein the program instructions further provide video clips of varying lengths, varying number video channels, and variable bit rate to optimize storage of the video surveillance.

In one embodiment, the vehicle activity information system comprises program instructions to: provide off-board storage, post analytics, report generation, and a user interface associated with customer retrieval of the collected and analyzed vehicular and driver information; create a report based on tracked vehicular and driver information parameters, wherein the report includes at least one of: driving trends, accident hot spots, risky driving behavior of the driver, vehicle route, and site performance; and remotely access the collected vehicular and driver information and the parameters. In other embodiments, the vehicle activity information system comprises program instructions to: automatically and wirelessly upload collected vehicular and driver information to the processor; and create a geofence for a fleet group, wherein the geofence comprises at least one person or entity for email notification of an event.

A vehicle activity information method is also disclosed. The method comprises: collecting driver and vehicular information; analyzing the collected vehicular and driver information; and configuring parameters for displaying the collected driver and vehicular parameters to improve driving behavior. In one embodiment, the vehicle and driver information and the parameters comprise at least one of: event details, observations, driver detail, sharing, download video, unsafe driving, stopping, speeding, driver behavior, collisions, equipment, scoring, map, location, coaching session, revise scoring, save coaching, no action, and fuel monitoring. In another embodiment, the method comprises reviewing and scoring the collected and analyzed vehicular and driver information, wherein the collected and analyzed vehicular and driver information is reviewed by a supervisor of a driver; and educating a driver based on improved driving behavior based on the collected and analyzed vehicular and driver information. In another embodiment, the method comprises automatically triggering collection of the vehicular and driver information, wherein a trigger comprises at least one of the vehicle running a red light, tailgating another vehicle or being tailgated by another vehicle, speeding as determined by a current speed limit based on a certain location as gathered by the system, g-force, manual operation, and the vehicle speeding at a predetermined rate.

In an embodiment, the vehicle activity information method further comprises collecting vehicular and driver data from a smartphone, tablet, or a plurality of integrated cameras, wherein the plurality of integrated cameras provide continuous video surveillance of an interior and an exterior of a vehicle, wherein the program instructions further provide video clips of varying lengths, varying number video channels, and variable bit rate to optimize storage of the video surveillance. In another embodiment, the method discloses providing off-board storage, post analytics, report generation, and a user interface associated with customer retrieval of the collected and analyzed vehicular and driver information; creating a report based on tracked vehicular and driver information parameters, wherein the report includes at least one of: driving trends, accident hot spots, risky driving behavior of the driver, vehicle route, and site performance; and remotely accessing the collected vehicular and driver information and the parameters. In yet another embodiment, the method comprises automatically and wirelessly uploading collected vehicular and driver information to the processor; and creating a geofence for a fleet group, wherein the geofence comprises at least one person or entity for email notification of an event.

A vehicle activity information apparatus is disclosed. The apparatus comprises an enclosure; a cable extending from the enclosure; and a data collecting device integrated within the enclosure. In an embodiment, the data collecting device comprises at least one of: a camera, a plurality of cameras, a forward view camera, a cabin view camera module, and a pan adjustable camera. In another embodiment, the apparatus comprises an antennae extending from the enclosure, a speaker, a microphone, an event button, a status light emitting diode, and an infrared light emitting diode. In one embodiment, the cable extends from the enclosure via a removable connector, wherein the cable comprises connections on a distal end of the cable, wherein the connections comprise CAN/J1939/ODB2 and power, RS-232 expansion, discretes, and external unit connections, wherein the external unit connections comprise at least one external camera unit with integrated audio, video, and power. In other embodiments, the apparatus comprises an internal GPS unit, local storage access, and a USB port integrated within the enclosure. In yet another embodiment, the apparatus comprises a wireless data collection and transmission device integrated within the enclosure for transmitting collected vehicular and river data.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "n," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one skilled in the art, one or more of the disclosed embodiments can be embodied as a method, system, or computer program usable medium or computer program product. Accordingly, the disclosed embodiments can in some instances that take the form of an entire hardware embodiment, an entire software embodiment or an embodiment combining software and hardware aspects all generally referred to herein as a "module". Furthermore, the disclosed embodiments may take the form of a non-transitory computer usable or readable medium, computer program product, a computer-readable tangible storage device storing computer program code, said computer program code comprising program instructions executable by said processor on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

The computer program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
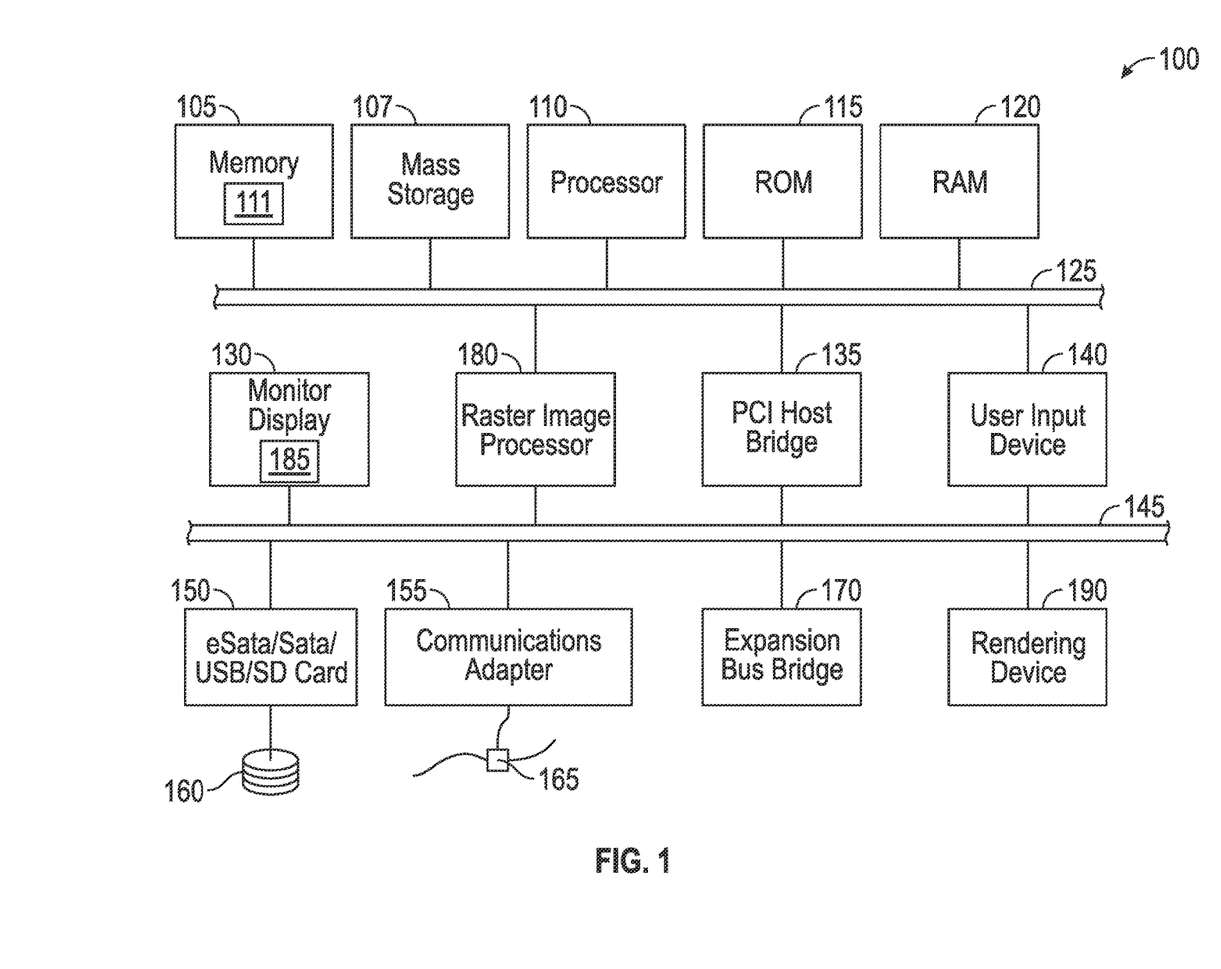
FIG. 1 illustrates an exemplary block diagram of an exemplary data-processing apparatus, in accordance with the disclosed embodiments.

FIG. 1 illustrates a block diagram of a sample data-processing apparatus 100, which can be utilized for an improved vehicular activity information system, method, and apparatus. Data-processing apparatus 100 represents one of many possible data-processing and/or computing devices, which can be utilized in accordance with the disclosed embodiments. It can be appreciated that data-processing apparatus 100 and its components are presented for generally illustrative purposes only and do not constitute limiting features of the disclosed embodiments.

As depicted in FIG. 1, a memory 105, a mass storage 107 (e.g., hard disk), a processor (CPU) 110, a Read-Only Memory (ROM) 115, and a Random-Access Memory (RAM) 120 are generally connected to a system bus 125 of data-processing apparatus 100. Memory 105 can be implemented as a ROM, RAM, a combination thereof, or simply a general memory unit, Module 111 includes software module in the form of routines and/or subroutines for carrying out features of the present invention and can be additionally stored within memory 105 and then retrieved and processed via processor 110 to perform a particular task. A user input device 140, such as a keyboard, mouse, or another pointing device, can be connected to PCI (Peripheral Component Interconnect) bus 145.

Data-process apparatus 100 can thus include CPU 110, ROM 115, and RAM 120, which are also coupled to a PCI (Peripheral Component Interconnect) local bus 145 of data-processing apparatus 100 through PCI Host Bridge 135. The PCI Host Bridge 135 can provide a low latency path through which processor 110 may directly access PCI devices mapped anywhere within bus memory and/or input/output (I/O) address spaces. PCI Host Bridge 135 can also provide a high bandwidth path for allowing PCI devices to directly access RAM 120.

A communications adapter 155 attaches to an eSata/Sata/USB/SD Card interface 150. An expansion bus-bridge 170 can also be attached to PCI local bus 145. The communications adapter 155 can be utilized for connecting data-processing apparatus 100 to a network 165. SCSI 150 can be utilized to control high-speed SCSI disk drive 160. An expansion bus-bridge 170 could be utilized for coupling an additional bus as needed. Note that PCI local bus 145 can further be connected to a monitor 130, which functions as a display (e.g., a video monitor) for displaying data and information for a user and also for interactively displaying a graphical user interface (GUI) 185. A user actuates the appropriate keys on the GUI 185 to select data file options. Note that the term "GUI" generally refers to a type of environment that represents programs, files, options and so forth by means of graphically displayed icons, menus, and dialog boxes on a computer monitor screen.

The embodiments described herein can be implemented in the context of a host operating system and one or more modules. Such modules may constitute hardware modules such as, for example, electronic components of a computer system. Such modules may also constitute software modules. In the computer programming arts, a software "module" can be typically implemented as a collection of routines and data structures that performs particular tasks or implements a particular abstract data type.

Software modules generally can include instruction media storable within a memory location of an image processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term "module" as utilized herein can therefore generally refer to software modules or implementations thereof. Such modules can be utilized separately or together to form a program product that can be implemented through signal-bearing media, including transmission media and/or recordable media. An example of such a module that can embody features of the present invention is a vehicular activity information module 204, as depicted in FIG. 2.

Figure 2:
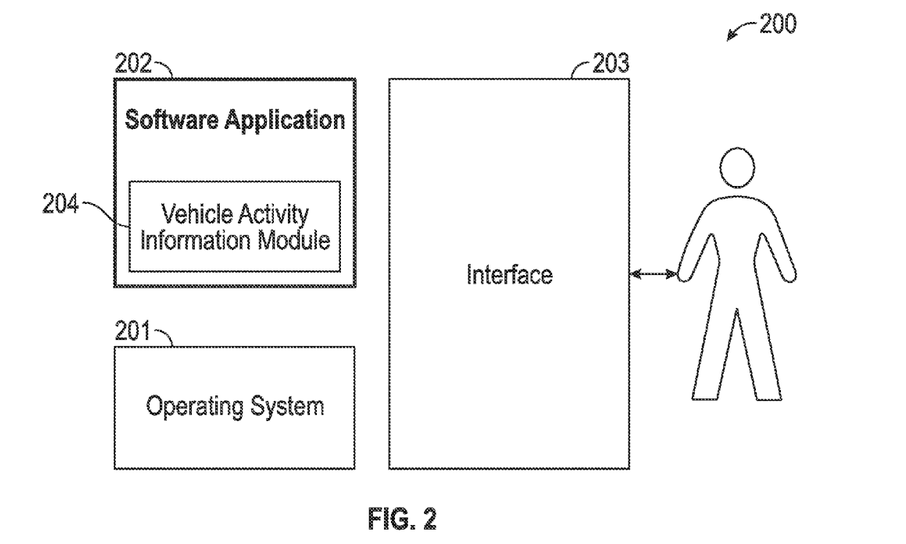
FIG. 2 illustrates an exemplary schematic view of an exemplary software system including an operating system, application software, and a user interface, in accordance with the disclosed embodiments.

FIG. 2 illustrates a schematic view of a software system 200 including an operating system, application software, and a user interface for carrying out the disclosed embodiments. Computer software system 200 directs the operation of the data-processing system 100 depicted in FIG. 1. Software application 202, stored in main memory 105 and on mass storage 107, includes a kernel or operating system 201 and a shell or interface 203. One or more application programs, such as software application 202, may be "loaded" (i.e., transferred from mass storage 107 into the main memory 105) for execution by the data-processing system 100. The data-processing system 100 receives user commands and data through the interface 203, as shown in FIG. 2. The user's command input may then be acted upon by the data-processing system 100 in accordance with instructions from operating module 201 and/or application module 202.

The interface 203 also serves to collect and analyze vehicle activity information, whereupon the user may supply additional inputs or terminate the session. In an embodiment, operating system 201 and interface 203 can be implemented in the context of a "Windows" system. It can be appreciated, of course, that other types of systems are possible. For example, rather than a traditional "Windows" system, other operation systems such as, for example, Linux may also be employed with respect to operating system 201 and interface 203. The software application 202 can include a vehicle activity information module. The software application 202 can also be configured to communicate with the interface 203 and various components and other modules and features as described herein.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program design to assist in the performance of a specific task such as word processing, accounting, inventory management, music program scheduling, etc.

Generally, program modules include routines, programs, objects, components, data structures, etc., that perform particular tasks or implement particular abstract data types. Moreover, those skilled in the art will appreciate that the disclosed method and system may be practiced with other computer system configurations such as, for example, handheld devices, multi-processor systems, microprocessor-based or programmable consumer electronics, networked PCs, minicomputers, mainframe computers, and the like.

Figure 3:
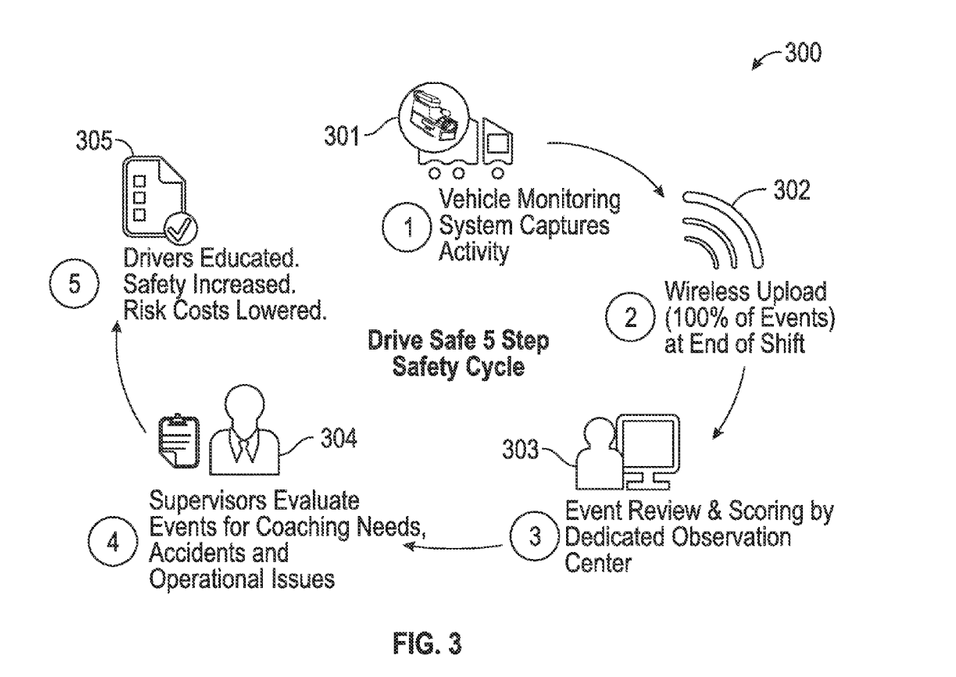
FIG. 3 illustrates an exemplary block diagram of the vehicle activity information system's safety cycle, according to a preferred embodiment.

FIG. 3 illustrates an exemplary bock diagram 300 of the vehicle activity information system's safety cycle, according to a preferred embodiment. The vehicle activity information system also includes the off-board storage, post analytics, report generation, and the user interface associated with the customer retrieval of the desired data. Vehicle monitoring system captures activity of a driver and vehicle and performs video analytics based on the captured activity 301. The captured activity is then automatically and wirelessly uploaded to the system at the end of a shift 302. The captured activity is then reviewed and scored by the system, an observation center, reviewing software, or human interpretation 303. Custom grading defines how a driver is scored based on recorded driving activity. System users (e.g., supervisors) evaluate events for driver's coaching needs, enhanced productivity and operations, vehicle accident, and other operational issues 304. The drivers are then educated based on the system's analysis of driving and vehicle behavior 305. An integrated filer coaches the driver's behavior based on custom-set guidelines and parameters. Parameters are set based on needs of the customer. Advanced event data in disclosed embodiments provide information based on certain parameters (e.g., vehicle speed, shock, driver, vehicle location, cause of trigger, etc.). These parameters are shown in a high-quality video gathered from the plurality of cameras within a vehicle. Disclosed embodiments provide detailed reporting based on the tracked parameters. The reporting displays trends, accident hot spots, and compares site performance, for example. The riskiest driving behaviors, vehicles, and routes are easily identified.

Figure 4:
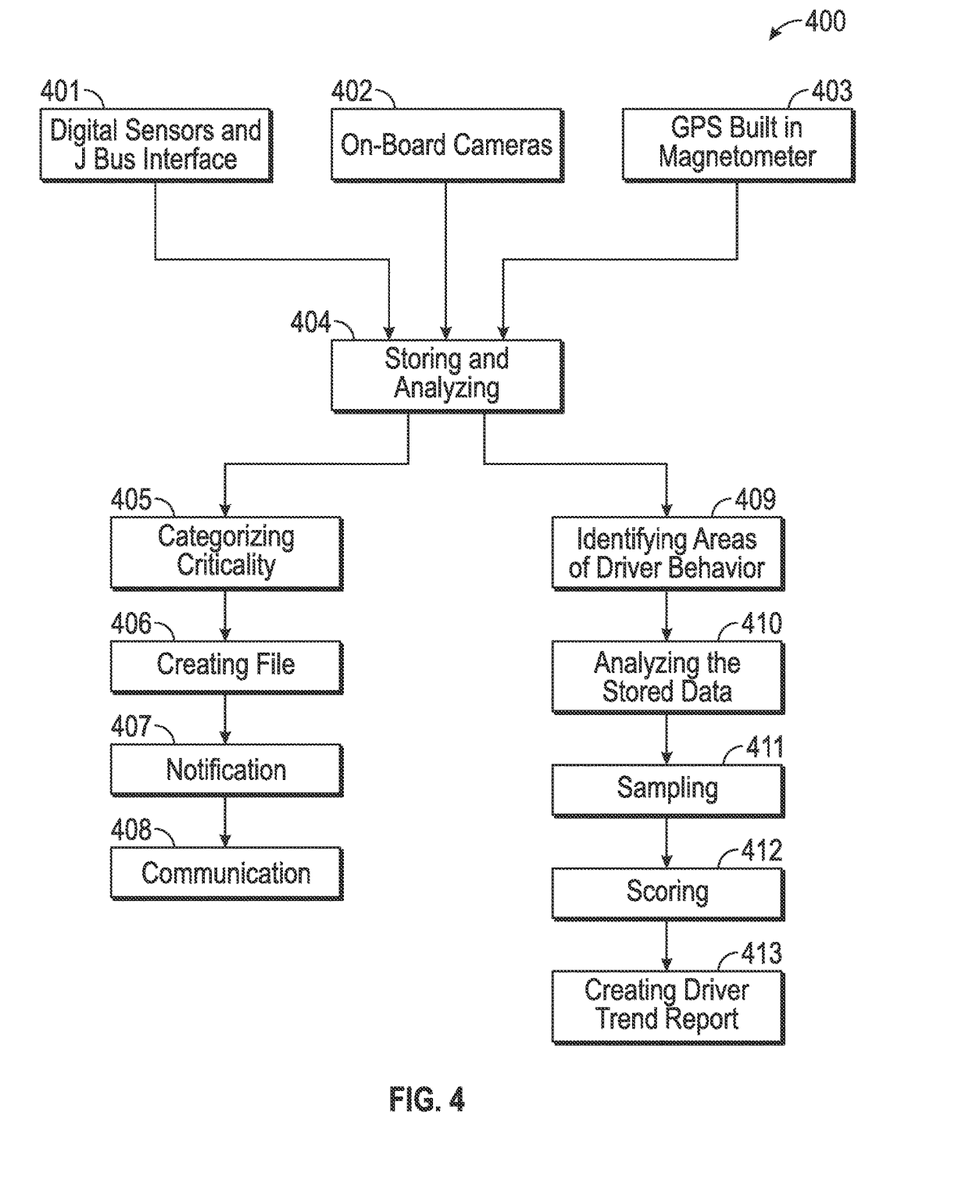
FIG. 4 illustrates an exemplary block diagram of the vehicle activity information system gathering and processing vehicle data, in accordance with the embodiments.

FIG. 4 illustrates an exemplary block diagram 400 of the vehicle activity information system gathering and processing vehicle data, in accordance with the embodiments. Vehicle and driver information is gathered via: a digital sensor and CAN/J1939/ODB2 interface as illustrated in block 401, an on-board camera, as illustrated in block 402; and a GPS/built in magnetometer, as illustrated in block 403. The gathered vehicle and driver information is stored and analyzed by the system, as illustrated in block 404. The analyzed information goes in separate paths. In the first path, the analyzed vehicle and driver information is categorized quickly as illustrated in block 405. In block 406, a new file is created for this categorized vehicle and driver information. A user is then notified of the categorized vehicle and driver information, as illustrated in block 407. The user could be an owner or a supervisor of a company, for example. Finally, the user could communicate the analyzed and categorized vehicle and driver information to another user, a supervisor, or the driver, as illustrated in block 408. The communication could include the analyzed vehicle and driver information, along with coaching suggestions on improvements to driving behavior based on the analyzed and categorized information.

In the second path, the stored and analyzed driver information from block 404 could be further analyzed to identify areas of driver behavior, as illustrated in block 409. The areas of driver behavior can then be stored in a database within the system, as illustrated in block 410. A sampling can be taken of the additionally analyzed information, as illustrated in block 411, to gather information about a particular driver or vehicle, or learn about trouble spots that need further attention from a supervisor. As illustrated in block 412, a score can be applied to the identified areas of driver behavior to further assist with coaching to improve driver behavior. A driver trend report can thereafter be created as illustrated in block 413.

Figure 5:
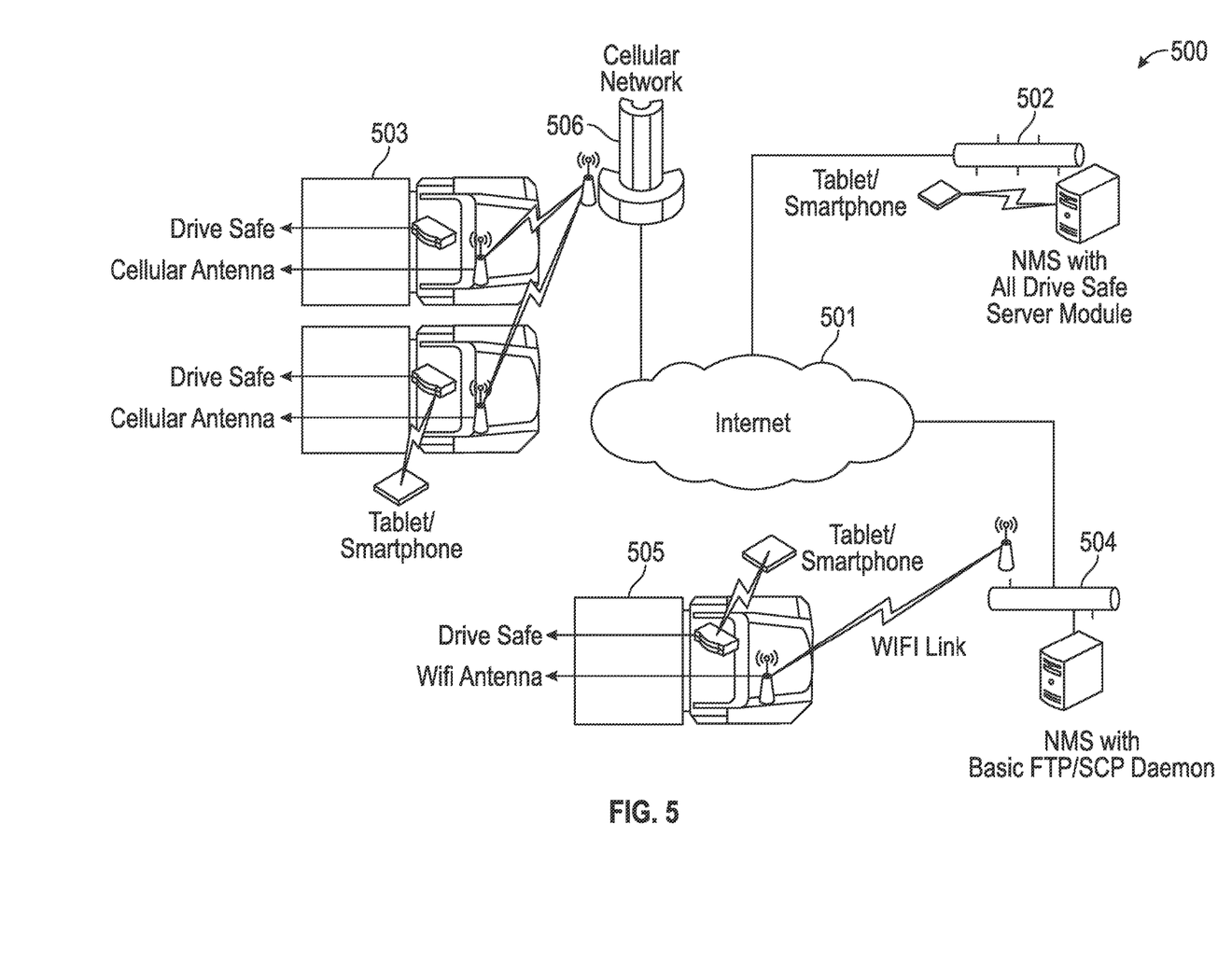
FIG. 5 illustrates an exemplary flow chart of operations illustrating a method for gathering and processing safety information, in accordance with the embodiments.

FIG. 5 illustrates an exemplary flow chart 500 of operations illustrating a method for gathering and processing safety information, in accordance with the embodiments. Vehicle and driver information is gathered from vehicle activity information system units installed with vehicles 503. The information is then routed from a tablet/smartphone through a cellular network 506 via the internet 501 to a NMS with an all drive safe server module 502. Vehicle driver information from vehicle 503 can also be routed via a tablet/smartphone via a WiFi/wireless link to a NMS with basic FTP/SCP daemon 504. The API and data representation is REST compliant to allow direct use by standard web technologies. The system runs a modern and complete operating system (Linux) in an embedded server that constantly monitors and records in a standard JSON format the vehicle telemetry, onboard vehicle computer data, and records external events. The embedded server constantly records video and audio from at least 1-8 camera(s). The system embodies various camera configurations. In one embodiment, two fixed cameras are utilized in the system in addition to a plurality (e.g., 2 or more up to 6 preferably, or more cameras added as needed) of either fixed, accessory, and/or built-in cameras.

The system performs real time video analysis to monitor drivers and vehicles behavior. Vehicle activity information system monitors speed through its GPS, the J1939 interface for diesel engines, and the OBD2 interface for gas engines, a set of four users configurable external trigger as well as. Any of these events can be configured to output a log of the data, create a jpeg picture, and/or capture a video. Each of the video camera and associated microphone can be either enabled or disabled depending on specific needs to maximize on-board storage. Certain activities of the driver, activities of the vehicle, and various road conditions trigger automatic operation of unit and system. Such triggers can include, for example, vehicle running a red light, tailgating another vehicle or being tailgated by another vehicle, speeding as determined by a current speed limit based on a certain location as gathered by system, g-force, manual operation, and the vehicle speeding at predetermined rate.

Figure 6:
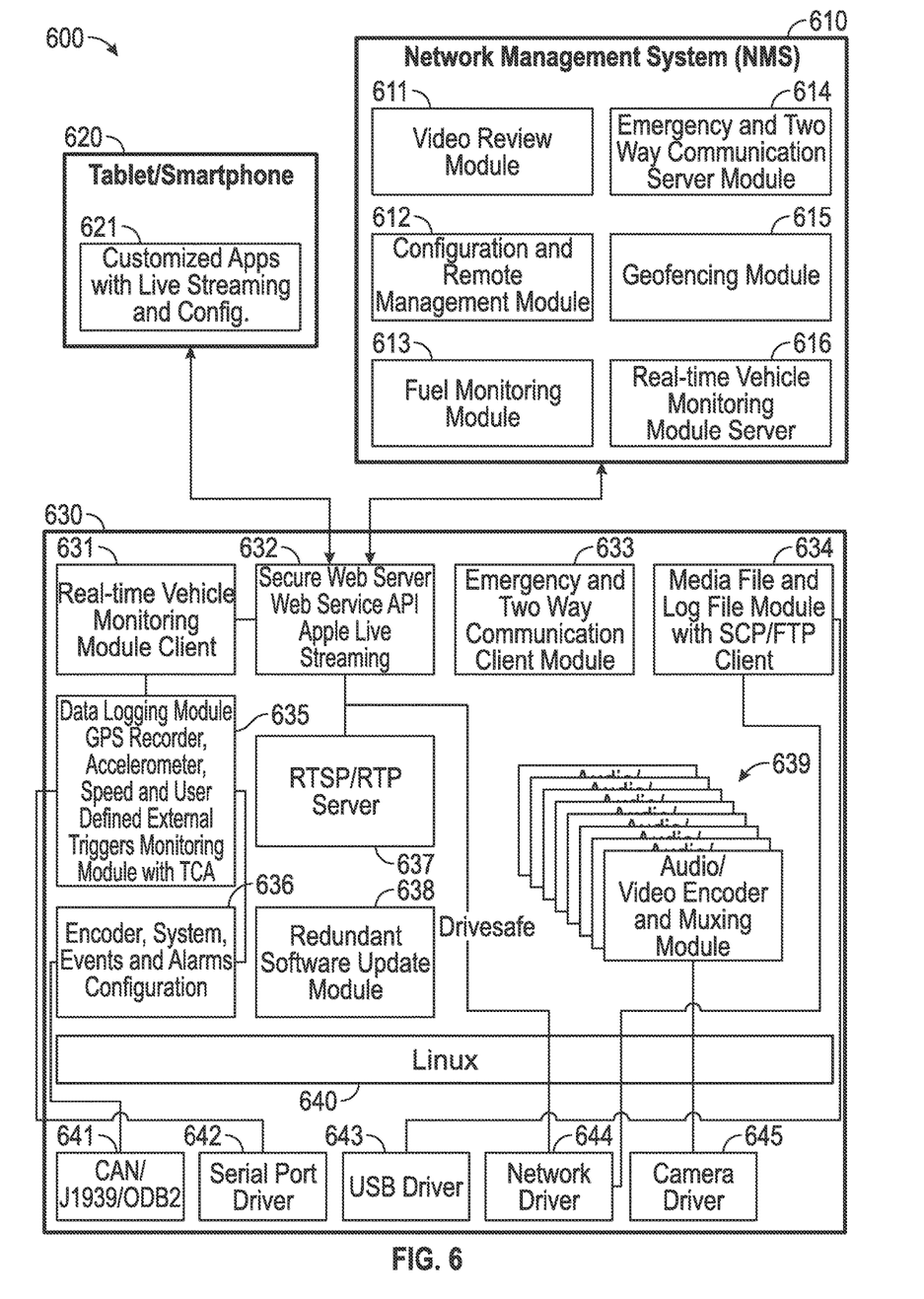
FIG. 6 illustrates an exemplary block diagram of operations illustrating a system for gathering and processing safety information, in accordance with the embodiments.

FIG. 6 illustrates an exemplary block diagram 600 of operations illustrating a system for gathering and processing safety information, in accordance with the embodiments. The illustrated system comprises a network management system ("NMS") 610, a computing device 620, and a vehicle activity information system unit apparatus 630. NMS further comprises a video review module 611, a configuration and remote management module 612, a fuel monitoring module 613, an emergency and two way communication server module 614, a geofencing module 615, and a real-time vehicle monitoring module server 616. Computing device 620 comprises at least one of a: tablet, smartphone, Android® device, iPhone®, or iPad®. Vehicle activity information system unit apparatus 630 comprises: a real-time vehicle monitoring module client 631, a secure web server 632 (e.g., web service API, Apple® Live streaming), an emergency two-way communication client module 633, and a media file and log file module with SCP/FTP client 634. SCP/FTP client 634 interacts with USB driver 643. The real-time vehicle monitoring module client 631 interacts with a data logging module 635. Data logging module 635 interacts with serial port driver 642. The data logging module 635 can include an accelerometer, and a speed and user defined external triggers monitoring module with TCA. Data logging module interacts with an encoder, system, events, and alarms configuration 636. Encoder 636 interacts with CAN driver (CAN/J1939/ODB2) 641. An RTSP/RTP server 637 interacts with network driver G/N 644 through a LINUX operating platform 640. A vehicle activity information system redundant software update module 638 is also included in vehicle activity information unit apparatus 630. Finally, audio/video encoder and mixing module 639 interacts with camera driver 645 through the LINUX operating platform.

Figure 7:
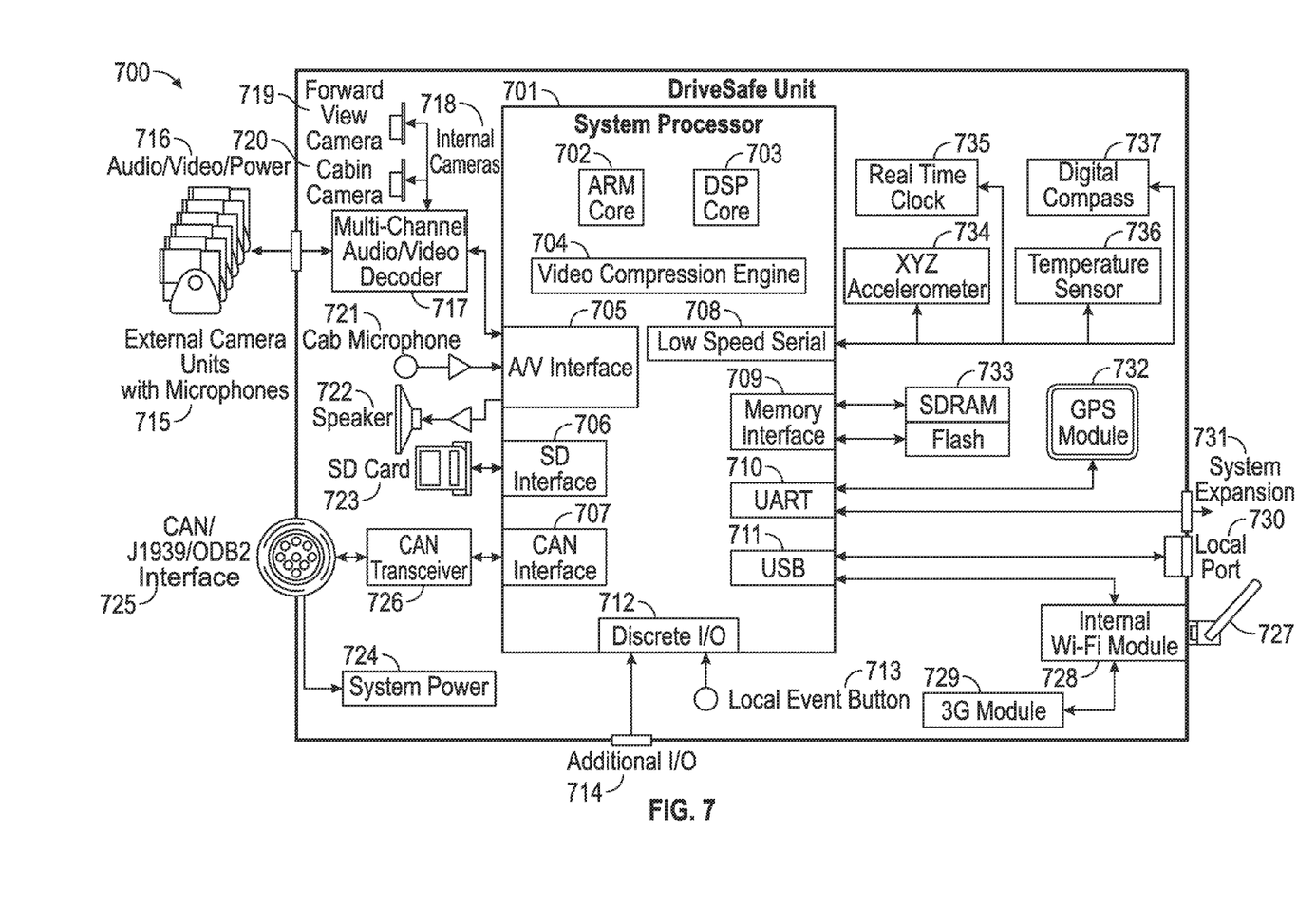
FIG. 7 illustrates an exemplary block diagram of the functional hardware of a vehicle activity information system unit, in accordance with the embodiments.

FIG. 7 illustrates an exemplary block diagram 700 of the functional hardware of a vehicle activity information apparatus, in accordance with the embodiments. The vehicle activity information apparatus comprises a system processor 701 and either a one piece enclosure or a two piece enclosure. The system processor 701 comprises an ARM Core 702 and a DSP Core 703, a video compression engine 704, an A/V Interface 705, a SD interface 706, a CAN interface 707, a low speed serial interface 708, a memory interface 709, UART 710, USB 711, and a discrete I/O 712. A local event button 713 and an additional I/O 714 interact with the discrete I/O 712.

The system processor 701 interacts with external camera units/microphones 715 through audio, video, and a power source 716. The audio/video/power source 716 interacts with a multi-channel audio/video decoder 717 through the system processor 701. The decoder 717 interprets data from internal cameras 718, both the forward view camera 719 and the cabin camera 720. Data collected from a cab microphone 721, speaker 722, and local storage (e.g., SD card, drives) 723 is processed via system processor 701. The system is provided with power through system power 724 via a CAN/J1939/ODB2 interface 725 and a can transceiver 726 that interacts with system processor 701.

The antenna 727 interacts with system processor 701 via an internal WiFi/wireless Module 728 and 3G module 729 for wireless data transmission and receipt. Also, interacting with system processor 701 are local port 730, system expansion 731, GPS module 732, SDRAM/Flash 733, a XYZ accelerator 734, real time clock 735, temperature sensor 736, and digital compass 737.

Figure 8A:
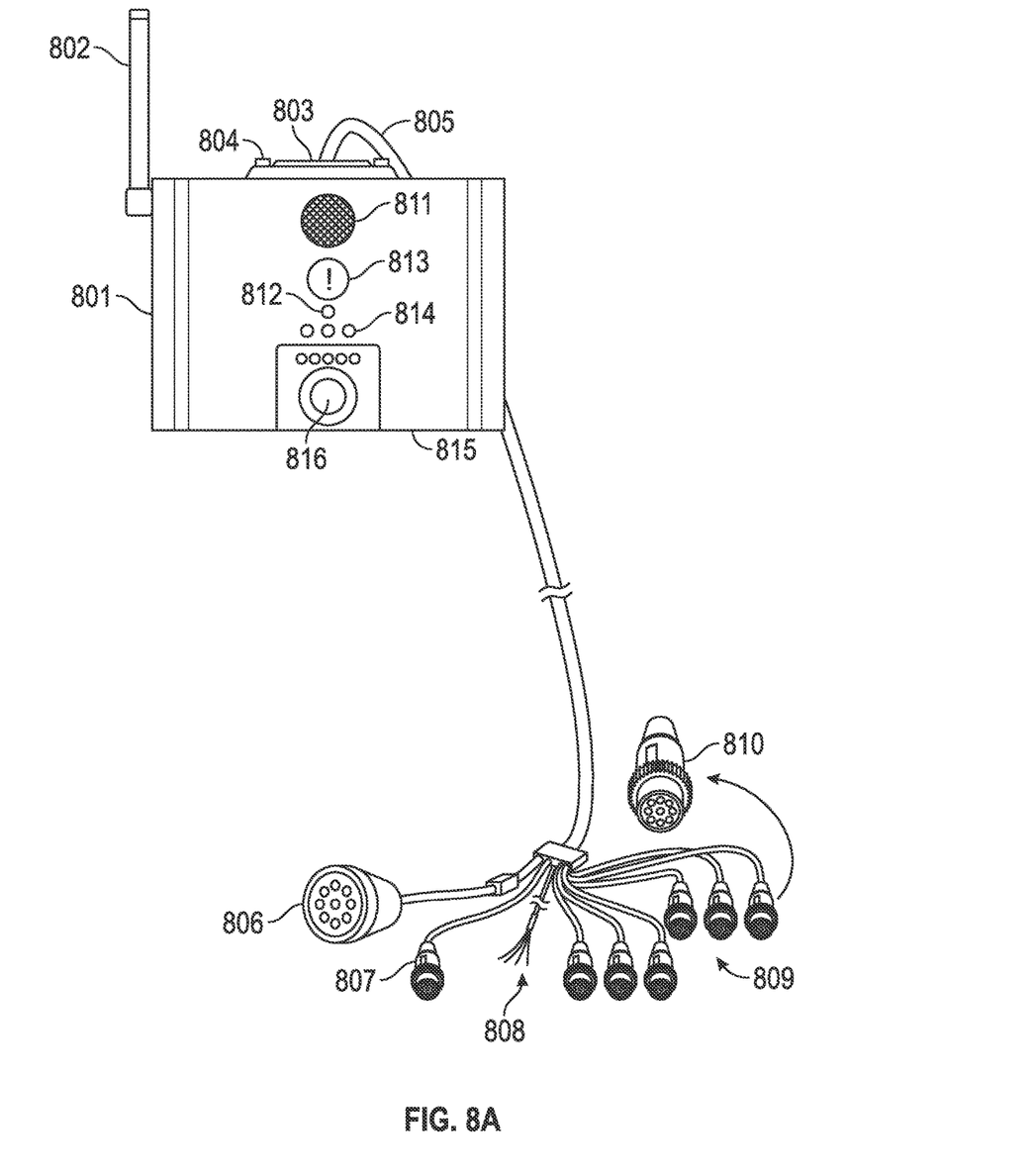
FIGS. 8A-8C illustrate an exemplary pictorial illustration of a vehicle activity information system unit apparatus, in accordance with the embodiments.

FIG. 8A illustrates an exemplary front plan view 800 of a vehicle activity information apparatus enclosure 801, in accordance with the embodiments. The front plan view 800 illustrates an enclosure 801 with an integrated antenna 802 and removable connector 803 with tamper resistant screws 804. The removable connector 803 comprises a cable 805 extending therefrom with various connections located on the cable's 805 distal end. The connections comprise: CAN/J1939/ODB2 and Power 806, RS-232 Expansion 807, Discretes 808, and External Unit Connections 809. The External Unit Camera Unit Connections 809 comprises at least one External Camera Unit 810 with integrated audio/video/power. The enclosure 801 further comprises a speaker 811, microphone 812, event button 813, status LEDs 814, IR LEDs 815, and a cabin view camera module 816 that is pan adjustable.

Figure 8B:
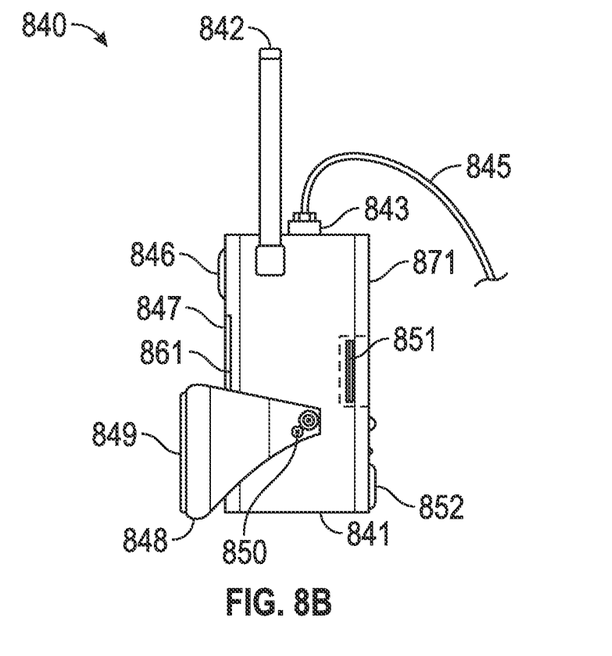

FIG. 8B illustrates an exemplary side plan view 840 of a vehicle activity information system apparatus enclosure 841, in accordance with the embodiments. The side plan view 840 illustrates an enclosure 841 with an integrated, adjustable antenna 842 and removable connector 843. The removable connector 843 has a cable 845 extending therefrom. The front portion 861 of the enclosure 841 further comprises a forward view camera 846, internal GPS unit 847, an adjustable mounting bracket 848 with an associated adhesive pad 849, and a tamper-proof tilt lock 850. The rear portion 871 of the enclosure 841 comprises a local storage device access with a secure tamper proof door 851 and a cabin view camera module 852.

Figure 8C:
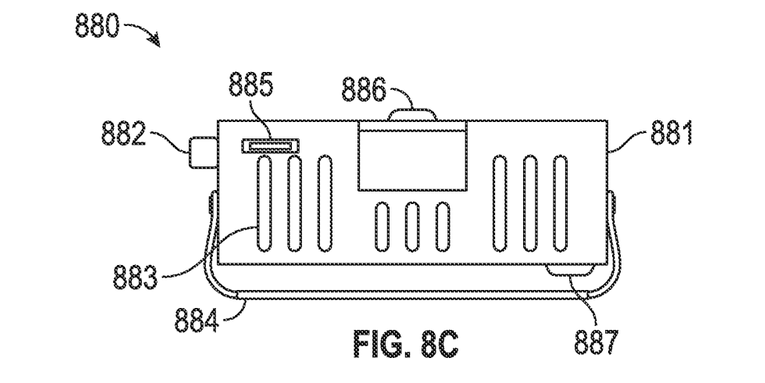

FIG. 8C illustrates an exemplary bottom plan view 880 of a vehicle activity information apparatus enclosure 881, in accordance with the embodiments. The enclosure 881 comprises an antenna 882, vents 883, a bracket 884, a local USB port 885, a cabin view camera module 886, and a forward view camera module 887.

Figure 9:
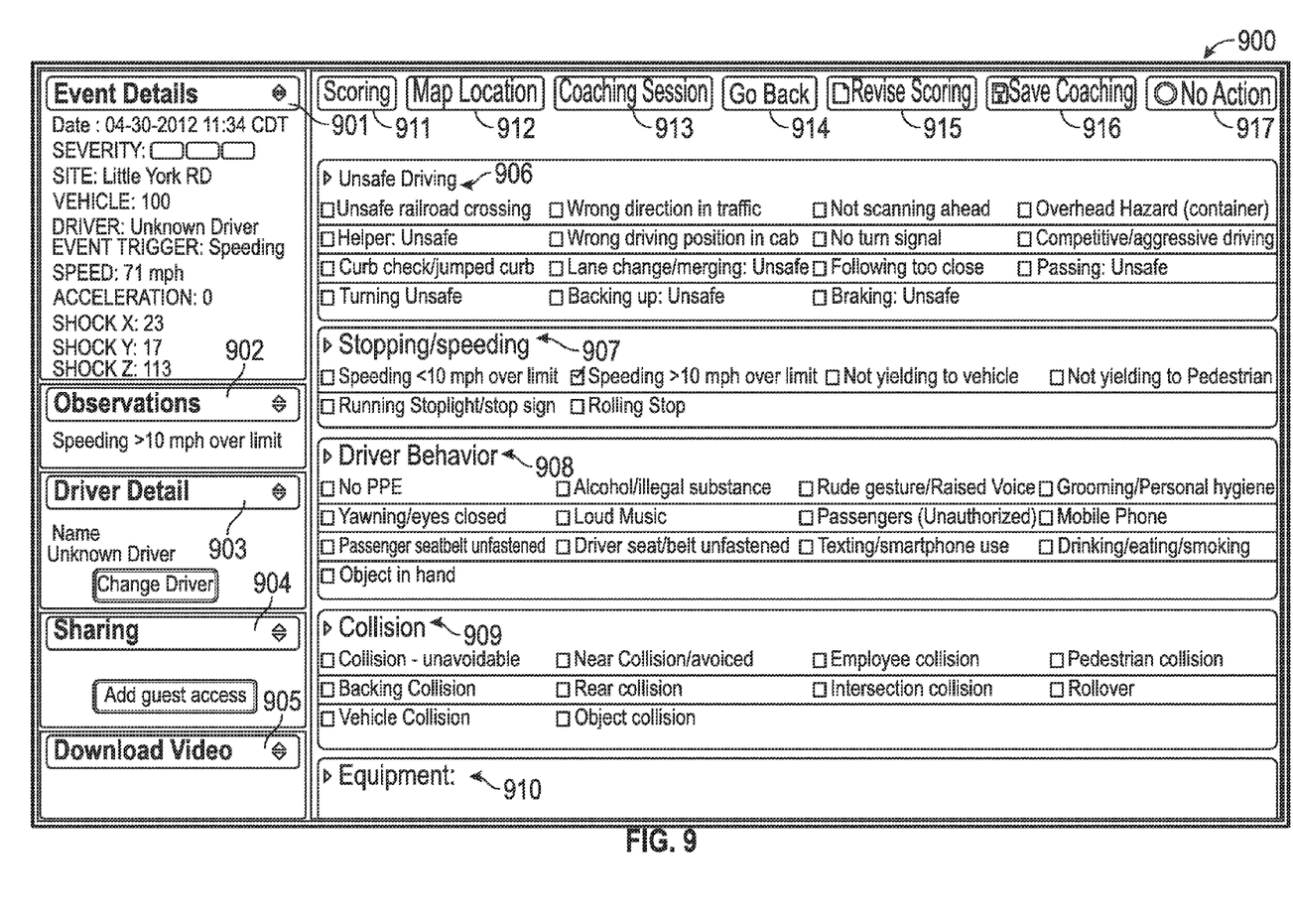
FIG. 9 illustrates an exemplary graphical user interface (GUI) for display of driver safety information gathered from the vehicle activity information system, in accordance with the disclosed embodiments.

FIG. 9 illustrates a pictorial illustration 900 of an exemplary graphical user interface (GUI) for display of driver safety information gathered from the vehicle activity information system, in accordance with the embodiments. Information and data gathered and processed in the disclosed vehicle activity information systems securely accessed through a web-based interface. A wide variety of parameters are viewed through the interface. A user can select displayed events or select particular parameters for viewing on the interface. For example, a supervisor of a company with a fleet of vehicles wants to view a vehicle's speed and location. Therefore, a supervisor with secure access to the system's GUI may filter the parameters to view only speed and location of particular vehicles in the fleet.

The GUI includes various selectable options for viewing. Options for viewing include: Event details 901, Observations 902, Driver Detail 903, Sharing 904, and Download Video 905, etc. Categories of driving events for a specific vehicle can be filtered according to: Unsafe Driving 906, Stopping/Speeding 907, Driver Behavior 908, Collision 909, Equipment 910, etc. Each category of driving events 906, 907, 908, 909, and 910 has expandable filters included under each tab as illustrated in FIG. 9. Users have the option to change views of vehicle and driver data within the GUI. Possible view selections include: Scoring 911, Map/Location 912, Coaching Session 913, Go Back 914, Revise Scoring 915, Save Coaching 916, and No Action 917, etc. It is understood that various GUI views can be incorporated into the vehicle activity information system.

SECURE REMOTE CONFIGURATION: Vehicle activity information system uniquely runs SSH client and daemon to allow the user to remote securely log into the device remotely to change the configuration or download video and/or audio clips. It can be remotely configured to change configuration parameter, specific event trigger on the fly, and download media files or log files. Using the SSH client to automatically log on the server, clips that have been tagged with events are transferred. The disclosed apparatus is a remotely manageable device that can be remotely configured to change configuration parameter, specific event trigger on the fly, and download video.

WiFi AND/OR WIRELESS CAMERA MONITORING: When the system is installed, the system is capable of sending video over WiFi and/or wireless to position the camera with a simple laptop and no external monitors are need.

SECURE REMOTE SOFTWARE UPDATE AND DIAGNOSTICS: When the units in networks communication range, it can be log onto through IP networks to run diagnostics.

ENCLOSURE DESIGN: The disclosed apparatus features a ruggedized design for industrial deployment. It is designed to have water, dust, and shock resistant common to industrial environment.

REDUNDANT SOFTWARE: The system includes dual redundant program copy that can survive power failures in middle of a software updates. The software also self-monitors and reports when the system is not functioning properly. Memory fault protection is included, thus rendering it resilient to software fault and failures. Should the disclosed system become instable as a whole, system triggers the watchdog that will restart the system in a known state.

DATA USAGE: The disclosed embodiments provide for video clips of varying lengths, varying number video channels, and variable bit rate to optimize the storage, flash card, hard drive, and/or data plan usage and minimize cost.

UNIQUE VIDEO AND AUDIO ENCODING TECHNOLOGY: While there are few system that use H264 base profile to record video onboard of a vehicles, vehicle activity information system embodiments uniquely encodes video with H264 with Main Profile, High Profile and it can also uniquely leverage the use of B-frames for extra compression. This unique characteristic gives up to 30% extra compression at the same bitrate or up to 30% better quality at the same bitrate. It uniquely encodes audio using an AAC codec to give better audio quality at same bitrate or better compression at the same quality. Video and audio extra clarity translate directly into an increase of positive identification of vehicles, licenses plates, driver voices for legal or court purposes. These audio and video codec are not used in other system because they are not able to fit in power and size footprint requirement of this application. Vehicle activity information system is the first system to achieve this level performance, feature set, and encoding density in this footprint.

TABLET/SMARTPHONE INTEGRATION: Vehicle activity information system provides a framework to integrate and communicate, display and manage with modern smartphone and tablet application such as Android® Apps, and Apple® IOS apps. The communication can be through Internet Protocol (IP) or USB. The secure web server serves all vehicle computer telemetry data over udp and/or top and video over RTP and/or Apple® Live streaming for seamless integration with Android® and Apple® IOS devices as direct client. These features are unique and have never been part of a vehicle's computer.

REMOTE NETWORK MANAGEMENT: Each of the vehicle activity information system apparatuses functions as a Network Element and can be in manage or un-manage state. It is a remotely manageable device that can be remotely configured to change configuration parameter, specific event trigger on the fly, and download video. It acts as a network element and as notification system. The network manager displays the Network Element on a map for tracking purpose.

EMERGENCY and TWO-WAY COMMUNICATION: In case of an accident where the driver and/or vehicle are incapacitated, the system will broadcast its location using the GPS and video (previously recorded and live) from the crash scene. This information can be forward directly to local authority or 9-1-1 to get help there as quickly as possible. Also, NMS (Network Management System) can also forward crash site information to all other fleet vehicles close in range to provide direct help and set a route on their onboard computer (or using the onboard system speaker to read direction to driver directly) to get there in minimum amount of time. The manager or the driver can use the same system to dispatch a voice call.

REAL-TIME VEHICLE MONITORING AND GEOFENCING MODULE: Driver behavior software and geofencing are integrated together in the disclosed embodiments. This unique NMS is an object oriented integrated system that allows the fleet manager to draw geofence object on the map. The fleet manager creates fleet groups and adds each of the network elements ("NE"). The fleet manager further creates objects for each person or entity that need to get notified through emails. These fleet groups can be associated to the geofence object and possible events with a set of rules control by a priority. Each rule can be exclusive or non-exclusive. It also has basic logical operation such as and, or, xor, xand. These rules can get triggered by the geofence or by the vehicle activity information system. For example, in the rental car industry, a set of rules can be created. If Avis® Rental car is in Houston_GeoFence and speeding email HoustonAvisManager with a report including driver name, license number, location, picture, and video files. If truck is on delivery route and has been stopped for 2 hours, email manager. If truck has an accident within west coast geofence, a high priority email is sent to west_coast_manager with location and a message to call him on cell phone.

FUEL MONITORING MODULE: Vehicle activity information systems embodiments' unique fuel monitoring module is independent of fuel technology. It works with CNG/LNG and diesel fuels. The system continuously monitors fuel usage through J1939 interface and OBD2 interface it will read MPG when it's available. It can infer data when MPG is not available through throttle position, break usage, acceleration and tire pressure, but it needs to be calibrated to produce non-relative numbers to properly estimate fuel cost. It generates report by brand and model of vehicle to compare relative efficiency. It can establish a fuel consumption baseline and compare different driver/vehicle pairs; it will propose optimum driver/vehicle combination based on the data that has been accumulated over time. It will also rank driver, vehicle, and driver/vehicle pair based on measured routes. The vehicle with the lowest performance is noted in the system.

Current computer and video systems do not perform continuous on-board recording and extended storage (e.g. weeks) of multi-channel audio, video, and related vehicle environmental data while simultaneously analyzing the data to determine which subset(s) should be wirelessly transmitted. This approach allows for a significant reduction in the amount of transmitted data, and associated cost, while insuring other potentially event pertinent data is not lost and can be retrieved later if further clarification is required. Current systems do not access and integrate additional vehicle information available on the CAN/J1939/ODB2 interface to perform further vehicle status and event processing. Optimal partitioning of on-board vs. off-board analytical processing load is also not performed by existing systems. The present invention utilizes multiple cameras and other sensing elements to detect events such as accidents. In providing information as to the circumstance surrounding the event, the system acts as an aide in determining responsibility of the event.

Additionally, the system uses a range of data sources to identify areas of driver behavior that need correction and assist in driver behavior modification. A statistical indication of vehicle performance is also obtained to allow for early identification of problem areas that could result in extended down time or above average operating costs. This combination of features and abilities ultimately results in saving users time and money in operation of their vehicle fleets. Another object of the present invention is integration with other vehicle systems via a standard bus interface to obtain further diagnostics, event, and processing data. Another object of the present invention is the capability of in-field software updates to maintain optimal system performance with limited effort. Another object of the present invention is the inclusion of an additional processing element specifically targeted and effective at execution of advanced algorithms. Another object of the invention is the ability to provide two way communications with the vehicle occupants. Another object of the invention is the ability to perform local (e.g., Wi-Fi) and longer range (e.g., cellular) communication to address different market segments.

The events are stored on the server categorically and by criticality to allow for efficient review based on the amount of administrator lime available. Instant notification of the occurrence of highly critical events may be routed to preselected company individuals along with a preselected set of event data and/or event description. The system records audio as well as video. The system has the ability to determine and improve driver efficiency based on time in route, time at station, the amount of time the vehicle is not active during the day, and operational efficiency related to driver behavior patterns such as undue acceleration. Individual performance can be rated against other drivers in the fleet.

The sampling and analysis is statistical based to avoid false detection. In this area, the reports are driver "trends" not a list of events the administrator has to analyze to get a trend. The system also has the ability to analyze the quality of the audio/video inputs and other general system diagnostics and notification of the administrator as to the nature of the problem. CAN/J1939/ODB2 interface uses its data to help determine the vehicle performance and as additional event data. For example, the driver's foot was still on the gas when the crash occurred, you can see on the video the car was swerving into the lane well before the driver hit the brake, etc. The reliability of the vehicle location determination is improved by using the last known good GPS coordinates or using closest cellular base station GPS coordinates, speed information from the CAN/J1939/ODB2, and the built in magnetometer (compass). Useful in rural, urban or cloudy environments where GPS satellite LOS is blocked by buildings, trees or other object.

In addition to event data, continuous storage of relevant data for post event retrieval in cases where the pre-selected trigger event dataset was not adequate 10 fully determine the event circumstances. Ease of system scalability of audio and video inputs, from 1 to 16, without a major system redesign. Backup method for location determination based on last known valid GPS location, truck speed (via the CAN/J1939/ODB2 interface) and direction based on a built in electronic compass for use when the GPS signal is lost in urban environments. Integration with the USB port allows for alignment for installation and local download of event data from the local storage (e.g., SD card) without having to remove the local storage. Pan adjustable unit cameras to allow for a wider range of windshield mounting/unit placement. Dedicated DSP for advanced algorithm processing that is not involved with standard DVR functions, communications, and low level diagnostics. CAN/J1939/ODB2 interface to obtain vehicular data not easily gained by other means for use in determining event circumstances, driver behavior, driver performance, and other functions.

The disclosed system detects when a vehicle has run a stop sign or stoplight. Detection of video degradation due to tampering or environmental factors. The ability to detect when the video is dead is built in. An algorithmic approach can be implemented that detects when something is smeared on the lens such as, mud, grease, etc. The video-based vehicle proximity detection assesses whether: the driver is following too close for the given speed, the driver is travelling into an occupied lane, whether the driver is looking where he is going most of the time, whether a driver's eyes are closed or open, and whether a driver's head is tilting down. The onboard system can be used to detect when a face changed then send the image back to the server where further face detection can be performed. This split approach keeps from having the entire face database on the truck unit of continuously storing pictures of the driver's face. This makes sure whoever is driving the truck is the one that should be driving. Lane departure, erratic driving, driving to close to the edge of the lane or road are also detected via the disclosed embodiments.

The intelligent threshold and complex event detection feature helps detection of low speed collisions with stationary objects. Some events are a combination of inputs that cannot be entered into a simple ax+by>Th formula. The system can use adaptive boosting methods (adaBoost) to detect these more complicated situations which could otherwise go undetected.

Additional system features: enclosure can either comprise a single enclosure or dual enclosure; more audio/video streams; video resolution will be changed to D1; on-board GPS module and magnetometer; small form factor; system will spilt into two devices (window unit & under dash unit); separate data and program memories; CAN/J1939/ODB2 interface; expansion feature through RS232, and other digital inputs and outputs. Hardware requirements: DM8147 Soc from Texas Instruments as main processing unit of vehicle activity information system 3.0; Total 512 MB/1 GB DDR3 SDRAM, 512 MB NAND flash for program storage; six External A/V stream support; video decoder to convert analog video signals to digital video data (TVP5158); two on-board NTSC camera modules; local CVBS video display output, video output selection switch; Audio: microphone and speaker will be provided to have bidirectional audio communication; Event Button: Button to activate any event by driver or any other user; LED: Three LED for indication; IR LED: To support night vision inside truck cabin; External Modules: UART based GPS module, USB based WiFi/wireless and Digital Compass; Data storage: local storage support; USB drive, eSata/Sata drive, Silicon ID chip; RS232 port; CAN transceiver to support CAN/J1939/ODB2; +12 VDC shall be available on CAN/J1939/ODB2 connector, Battery backup is not required; Temperature range: 0° C. to +55° C.

Additional software requirements: Read speed, throttle position and fuel consumption from truck's computer using CAN/J1939/ODB2/J1939; watchdog driver to reboot the system in case of crash: support for DCAN Driver in RDK; connect the available GPS module to serial port; Module to: read latitude and longitude and measure GPS Strength; read Temperature Sensor, EEPROM and Magnometer using I2C; support for SSH and SCP; upgrade kernel and file system from remote server; BSP shall be in NAND with UBIFS file format; Support triggers from below points and support logging based on triggers: Accelerometer, Speed (From DCAN Bus), 4 GPIOs (Note: Logging mechanism is described in Phase 1 software SOW.pdf); On trigger, capture MP4 video and take JPEG snapshot; If battery is running out, load trigger files to the server is Wi-Fi connectivity is available; Use GIT for version control; Develop a command-line based "Video Capture" application which does the following: Capture 8 audio and video (D1) channels from TVP5158; Encode video and audio data in H264 HP and AAC respectively. Encoder shall support variable bit-rate, fps and GOP size; Multiplex the data using FFMPEG and store it in DDR in MP4 format; At every 2-3600 sec, store the MP4 file in SD card; Video frame-rate: 1-29.97 fps; Variable GOP as per support in RDK; Video Encode bit-rate: 100 Kbit/sec to 2 Mbits/sec; Audio bit-rate: 4 kb/sec to 128 kb/sec; MP4 file duration: 2-3600 sec; Remote server IP; How many channels to be recorded; GPS location of the remote servers; Pass the configurations as command-line parameter to script/executable; If local storage (e.g., SD card) is full, overwrite oldest day/hour directory and delete it.

It will be appreciated that variations of the above-disclosed and other features and functions, or alternatives thereof, may be desirably combined into many other different systems or applications. Furthermore, various presently unforeseen or unanticipated alternatives, modifications, variations or improvements therein may be subsequently made by those skilled in the art which are also intended to be encompassed by the following claims.

What is claimed is:

1. A vehicle activity information system, comprising:
    a vehicle activity information unit comprising an accelerometer, a compass, a temperature sensor, a real time clock, a GPS module, a system processor, a forward view camera, a cabin camera, a cab microphone, a speaker, and an internal WIFI module housed in an enclosure;
    at least one external camera unit;
    a processor;
    a data bus coupled to said processor; and
    a non-transitory computer-usable tangible storage device storing computer program code, said computer program code comprising program instructions executable by said processor, said program instructions comprising:
        program instructions to collect driver and vehicular information from said vehicle activity information unit and said at least one external camera unit;
        program instructions to analyze said collected vehicular and driver information;
        program instructions for processing said analyzed vehicular and driver information in a first path, said first path comprising:
            categorizing said driver and vehicular information; and
            communicating the driver and vehicular information and coaching suggestions according to said driver and vehicular information to a user;
        program instructions for processing said analyzed driver and vehicular information in a second path, said second path comprising:
            reviewing said analyzed driver and vehicular information to identify areas of driver behavior; and
            scoring said identified areas of driver behavior.

2. The vehicle activity information system of claim 1 wherein said vehicle and driver information comprise at least one of: event details, observations, driver detail, sharing, download video, unsafe driving, stopping, speeding, driver behavior, collisions, equipment, scoring, map, location, coaching session, revise scoring, save coaching, no action, and fuel monitoring.

3. The vehicle activity information system of claim 1 further comprising:
    program instructions to review said score of said collected and said analyzed vehicular and driver information, wherein said collected and said analyzed vehicular and driver information is reviewed by a supervisor of a driver; and
    program instructions to educate a driver based on said collected and said analyzed vehicular and driver information.

4. The vehicle activity information system of claim 1 further comprising program instructions to automatically trigger collection of said vehicular and driver information from said vehicle activity information unit and said at least one external camera unit, wherein a trigger comprises at least one of said vehicle running a red light, tailgating another vehicle or being tailgated by another vehicle, speeding as determined by a current speed limit based on a certain location as gathered by said system, g-force, manual operation, and said vehicle speeding at a predetermined rate.

5. The vehicle activity information system of claim 1 further comprising program instructions to collect vehicular and driver data from a smartphone, tablet, or a plurality of integrated cameras, wherein said plurality of integrated cameras provide continuous video surveillance of an interior and an exterior of a vehicle, wherein said program instructions further provide video clips of varying lengths, varying number video channels, and variable bit rate to optimize storage of said video surveillance.

6. The vehicle activity information system of claim 1 further comprising:
program instructions to provide off-board storage, post analytics, report generation, and a user interface associated with said user retrieval of said collected and said analyzed vehicular and driver information;
program instructions to create a report based on tracked vehicular and driver information parameters, wherein said report includes at least one of: driving trends, accident hot spots, risky driving behavior of said driver, vehicle route, and site performance; and
program instructions to remotely access said collected vehicular and driver information and said parameters.

7. The vehicle activity information system of claim 1 further comprising:
program instructions to automatically and wirelessly upload collected vehicular and driver information to said processor;
program instructions to create a geofence for a fleet group; and
program instructions to email notification of an event related to said geofence to at least one person or entity.

8. A vehicle activity information method, comprising:
collecting driver and vehicular information with a vehicle activity information unit comprising an accelerometer, a compass, a temperature sensor, a real time clock, a GPS module, a system processor, a forward view camera, a cabin camera, a cab microphone, a speaker, and an internal WIFI module housed in an enclosure; and at least one external camera unit;
analyzing said collected vehicular and driver information;
processing said analyzed vehicular and driver information in a first path, said first path comprising:
categorizing said driver and vehicular information; and
communicating said driver and vehicular information and coaching suggestions according to said driver and vehicular information to a user;
processing said analyzed driver and vehicular information in a second path, said second path comprising:
reviewing said analyzed driver and vehicular information to identify areas of driver behavior; and
scoring said identified areas of driver behavior.

9. The vehicle activity information method of claim 8 wherein said vehicle and driver information comprises at least one of: event details, observations, driver detail, sharing, download video, unsafe driving, stopping, speeding, driver behavior, collisions, equipment, scoring, map, location, coaching session, revise scoring, save coaching, no action, and fuel monitoring.

10. The vehicle activity information method of claim 8 further comprising:
reviewing said score and said collected and said analyzed vehicular and driver information, wherein said collected and said analyzed vehicular and driver information is reviewed by a supervisor of a driver; and
educating a driver based on said collected and said analyzed vehicular and driver information.

11. The vehicle activity information method of claim 8 further comprising automatically triggering collection of said vehicular and driver information from said vehicle activity information unit and said at least one external camera unit, wherein a trigger comprises at least one of said vehicle running a red light, tailgating another vehicle or being tailgated by another vehicle, speeding as determined by a current speed limit based on a certain location as gathered by said system, g-force, manual operation, and said vehicle speeding at a predetermined rate.

12. The vehicle activity information method of claim 8 further comprising collecting vehicular and driver data from a smartphone, tablet, or a plurality of integrated cameras, wherein said plurality of integrated cameras provide continuous video surveillance of an interior and an exterior of a vehicle, wherein said program instructions further provide video clips of varying lengths, varying number video channels, and variable bit rate to optimize storage of said video surveillance.

13. The vehicle activity information method of claim 8 further comprising:
providing off-board storage, post analytics, report generation, and a user interface associated with said user retrieval of said collected and said analyzed vehicular and driver information;
creating a report based on tracked vehicular and driver information parameters, wherein said report includes at least one of: driving trends, accident hot spots, risky driving behavior of said driver, vehicle route, and site performance; and
remotely accessing said collected vehicular and driver information and said parameters.

14. The vehicle activity information method of claim 8 further comprising:
automatically and wirelessly uploading collected vehicular and driver information to said processor;
creating a geofence for a fleet group; and
emailing a notification of an event related to said geofence to at least one person or entity.

* * * * *